United States Patent
Uchida et al.

(10) Patent No.: US 12,516,430 B2
(45) Date of Patent: Jan. 6, 2026

(54) SOLID OXIDE ELECTROLYSIS CELL, AND METHOD AND SYSTEM FOR OPERATING SAME

(71) Applicant: UNIVERSITY OF YAMANASHI, Kofu (JP)

(72) Inventors: Hiroyuki Uchida, Kofu (JP); Hanako Nishino, Kofu (JP)

(73) Assignee: UNIVERSITY OF YAMANASHI, Kofu (JP)

( * ) Notice: Subject to any disclaimer, the term of this patent is extended or adjusted under 35 U.S.C. 154(b) by 903 days.

(21) Appl. No.: 17/440,979

(22) PCT Filed: Mar. 19, 2020

(86) PCT No.: PCT/JP2020/012237
§ 371 (c)(1),
(2) Date: Sep. 20, 2021

(87) PCT Pub. No.: WO2020/196236
PCT Pub. Date: Oct. 1, 2020

(65) Prior Publication Data
US 2022/0170169 A1     Jun. 2, 2022

(30) Foreign Application Priority Data
Mar. 27, 2019   (JP) ................. 2019-059530

(51) Int. Cl.
*C25B 11/091* (2021.01)
*C25B 1/04* (2021.01)
(Continued)

(52) U.S. Cl.
CPC ............. *C25B 11/091* (2021.01); *C25B 1/04* (2013.01); *C25B 11/02* (2013.01); *C25B 15/02* (2013.01);
(Continued)

(58) Field of Classification Search
CPC ......... C25B 1/04; C25B 1/042; C25B 11/091; C25B 11/031; C25B 11/02; C25B 11/054;
(Continued)

(56) References Cited

U.S. PATENT DOCUMENTS 9,893,367 B1 *   2/2018   Son ................... C23C 14/185

FOREIGN PATENT DOCUMENTS

| JP | H08-162120 A | 6/1996 |
| JP | H10-21934 A | 1/1998 |
| JP | 2014034727 A | 2/2014 |

OTHER PUBLICATIONS

Hiroyuki Uchida et al., Important Roles of Ceria-Based Materials on Durability of Hydrogen and Oxygen Electrodes for Reversible SOEC/SOFC, 2017 ECS Trans. 78 3189 (Year: 2017).*

(Continued)

*Primary Examiner* — Luan V Van
*Assistant Examiner* — Mofoluwaso S Jebutu
(74) *Attorney, Agent, or Firm* — Maier & Maier, PLLC

(57) ABSTRACT

A method for operating a solid oxide electrolysis cell which can suppress degradation of the hydrogen electrode, is provided. A method for operating a solid oxide electrolysis cell includes a hydrogen electrode, an oxygen electrode, and an electrolyte layer sandwiched between the hydrogen electrode and the oxygen electrode. The hydrogen electrode includes a catalyst layer structured with Ni-containing particles dispersed and supported on a porous mixed ionic and electronic conducting oxide. The method includes an alternating operation in which a water vapor electrolysis operation and a fuel cell operation are repeated alternately.

7 Claims, 12 Drawing Sheets

(51) Int. Cl.
  *C25B 11/02* (2021.01)
  *C25B 15/02* (2021.01)
  *H01M 8/1253* (2016.01)
  *H01M 8/126* (2016.01)

(52) U.S. Cl.
  CPC ......... *H01M 8/1253* (2013.01); *H01M 8/126* (2013.01)

(58) Field of Classification Search
  CPC ..... C25B 11/067; C25B 11/075; C25B 13/07; C25B 15/02; H01M 4/9033; H01M 4/9066; H01M 8/1253; H01M 8/126; H01M 8/12; H01M 8/1213; H01M 8/1226; H01M 8/1231
  See application file for complete search history.

(56) References Cited

OTHER PUBLICATIONS

Hiroyuki Uchida, Pramote Puengjinda, Kazuki Shimura, Hanako Nishino, Katsuyoshi Kakinuma and Manuel E. Brito, Important Roles of Ceria-Based Materials on Durability of Hydrogen and Oxygen Electrodes for Reversible SOEC/SOFC, 2017 ECS Trans. 78 3189 (Year: 2017).*
Graves, C., Ebbesen, S., Jensen, S. et al. Eliminating degradation in solid oxide electrochemical cells by reversible operation. Nature Mater 14, 239-244 (2015). (Year: 2015).*
Jie Guan et al., High Performance Flexible Reversible Solid Oxide Fuel Cell, Performed under DOE Cooperative Agreement DE-FC36-04GO14351, GE Global Research Center, 2006 (Year: 2006).*
Office Action issued on Nov. 21, 2023, in corresponding Japanese Application No. 2021-509304, 8 pages.
Hiroyuki Uchida, et al.; "Important Roles of Ceria-Based Materials on Durability of Hydrogen and Oxygen Electrodes for Reversible SOEC/SOFC"; ECS Transactions; The Electrochemical Society; vol. 78, No. 1; May 30, 2017; XP055923077; ISSN: 1938-5862; 8 pages.
Extended European Search Report issued May 30, 2022 in Application No. 20778932.2-1108 / 3951018 PCT/JP2020012237; 7 pages.
International Search Report issued on Jun. 9, 2020 in corresponding International application No. PCT/JP2020/012237; 5 pages.
Hoerlein et al., "A parameter study of solid oxide electrolysis cell degradation: Microstructural changes of the fuel electrode", Electrochimica Acta, 2018, pp. 162-175, 276; 14 pages.
Uchida et al., "Double Layer-Type Electrodes for Reversible Solid Oxide Fuel Cells", ECS Transactions, 2007, pp. 365-371, 7 (1); 8 pages.
Puengjinda et al., "Effect of Microstructure on Performance of Double-Layer Hydrogen Electrodes for Reversible SOEC/SOFC", Journal of The Electrochemical Society, 2017, pp. F889-F894, 164 (9): 6 pages.
Graves et al., "Eliminating degradation in solid oxide electrochemical cells by reversible operation", Nature Materials, 2015, 14, 239; 6 pages.
International Preliminary Report on Patentability issued on Dec. 21, 2020 in corresponding International application No. PCT/JP2020/012237; 16 pages.

\* cited by examiner

1

(a1) oxygen electrode(continuous)
(a2) oxygen electrode(alternating)
(b1) hydrogen electrode(continuous)
(b2) hydrogen electrode(alternating)
(c1) oxygen electrode(continuous)
(c2) oxyten electrode(alternating)
(d1) hydrogen electrode(continuous)
(d2) hydrogen electrode(alternatng)

Catalyst Layer Before Starting Operation

Catalyst Layer After Alternating Operation

Catalyst Layer After Alternating Operation (with white circle at climbing portion)

SOLID OXIDE ELECTROLYSIS CELL, AND METHOD AND SYSTEM FOR OPERATING SAME

FIELD

The present invention relates to a solid oxide electrolysis cell, and to a method and system for operating the same.

BACKGROUND

Introduction of renewable energy generation such as solar power and wind power generation is rapidly increasing in order to construct a distributed power system that is resilient to natural disasters and can reduce $CO_2$ emission. Since the output of these power sources fluctuate greatly, it is essential to develop technologies to level the power in order to introduce a large amount of power into the power system in the future. Lithium-ion batteries and sodium-sulfur batteries are suitable for short-term, small to medium-scale energy storage, but their cost and installation volume (or footprint) are too large for long-term, large-scale energy storage. For example, for large scale storage of more than GWh, "Power to Gas" is being actively considered, especially in Germany.

In the Strategic Roadmap for Hydrogen and Fuel Cells published by METI in June 2014 and revised in March 2016, it was assumed that hydrogen production by water electrolysis would be in full effect around 2040. However, since the suppression of solar power and wind power output at Kyushu Electric Power in 2018 became a serious issue, it is quite necessary to accelerate the "Power to Gas" further. In addition, the revision of the Japan Revitalization Strategy approved by the Cabinet in June 2015 clearly states that a model for a hydrogen society should be established in which hydrogen is electrolytically produced using renewable electricity abundant in rural areas and transported to high-demand areas such as urban areas. Accordingly, it is necessary to promote research and development of water electrolysis technology that can deal with output fluctuations, being inexpensive, stable, and highly efficient at the current stage.

Among the water electrolysis technologies, conventional alkaline water electrolysis is inexpensive, however, due to gas generation in the electrolyte, it cannot be operated at high current density with power fluctuation, and the system efficiency is as low as about 70%. On the other hand, solid polymer electrolyte water electrolysis can be operated with high efficiency (stack 85%, system 80%) at high current density even with power fluctuation, but it requires expensive noble metal catalysts and polymer electrolyte membranes and thus it is limited to small-scale applications. Therefore, water vapor electrolysis (Solid Oxide Electrolytic Cell: SOEC), which satisfies the above requirements and is expected to have a high efficiency of about 90%, is very promising. SOEC can be operated reversibly as a solid oxide fuel cell (SOFC) and can generate electricity with high efficiency using stored hydrogen as fuel, and thus can contribute greatly to the realization of a low-carbon society.

In order to use SOEC for storing large-scale renewable energy, it is very essential to develop highly efficient and highly durable cells/stacks. Recently, the degradation of SOEC hydrogen electrode due to depletion of Ni has been reported as a serious problem. Recent studies have reported that the Ni depletion rate near the YSZ solid electrolyte interface increases with increasing current density, water vapor partial pressure $p(H_2O)$, and temperature, but the mechanism and method for suppressing such a degradation are completely unknown (non-patent literature 1).

Conventional hydrogen electrodes, for example, are prepared by sintering mixture of micron-sized Ni and gadolinia-doped ceria (GDC) or yttria-stabilized zirconia (YSZ). Since the effective reaction zone (ERZ) is limited to the contacting area of these two components near the YSZ solid electrolyte, the current tends to concentrate in such a zone. Accordingly, as a countermeasure, for example, a double-layered hydrogen electrode has been prepared by the inventors of the present invention (non-patent literature 2).

Thus, the degradation rate of the hydrogen electrode for solid oxide electrolysis cell, which can be operated in both modes of SOEC and SOFC, should be mitigated further.

Non-Patent Literature

[non-patent literature 1] M. P. Hoerlein et al., Electrochim Acta, 276, 162 (2018).
[non-patent literature 2] H. Uchida et al., ECS Trans., 7(1), 365 (2007); J. Electrochem. Soc., 164, F889 (2017).
[non-patent literature 3] C. Graves et al., Nat. Mater., 14, 239 (2015).

SUMMARY OF INVENTION

The present invention has been made by taking the afore-mentioned circumstances into consideration. An object of the present invention is to provide a method for operating a solid oxide electrolysis cell, which can suppress degradation of the hydrogen electrode.

According to the present invention, a method for operating a solid oxide electrolysis cell comprising a hydrogen electrode, an oxygen electrode, and an electrolyte layer sandwiched between the hydrogen electrode and the oxygen electrode; wherein the hydrogen electrode comprises a catalyst layer structured with Ni-containing particles dispersed and supported on a porous mixed ionic and electronic conducting oxide; and the method comprises an alternating operation step in which a water vapor electrolysis operation and a fuel cell operation are repeated alternately, is provided.

According to the present invention, the degradation of the hydrogen electrode can be suppressed.

DETAILED DESCRIPTION

Hereinafter, embodiments of the present invention will be explained with reference to the drawings. Various distinctive features shown in the following embodiments can be combined with each other. In addition, an invention can be established independently for each of the distinctive features.

1. Solid Oxide Electrolysis Cell 1

Figure 1:
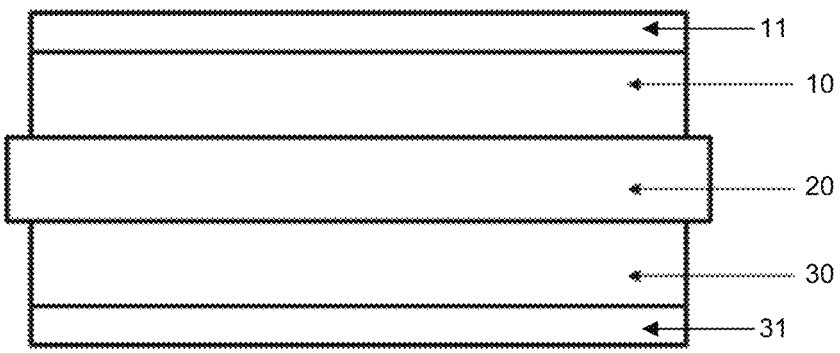
FIG. 1 is an outline structure of the solid oxide electrolysis cell 1 used in the present invention.

As shown in FIG. 1, the solid oxide electrolysis cell 1 according to one embodiment of the present invention comprises a hydrogen electrode 10, an electrolyte layer 20, and an oxygen electrode 30. At the hydrogen electrode 10 side, a hydrogen electrode separator 11 is provided, and at the oxygen electrode 30 side, an oxygen electrode separator 31 is provided. When the separators 11 and 31 need not be distinguished from each other, they are collectively referred to as "separator".

1-1. Hydrogen Electrode 10

Figure 2A:
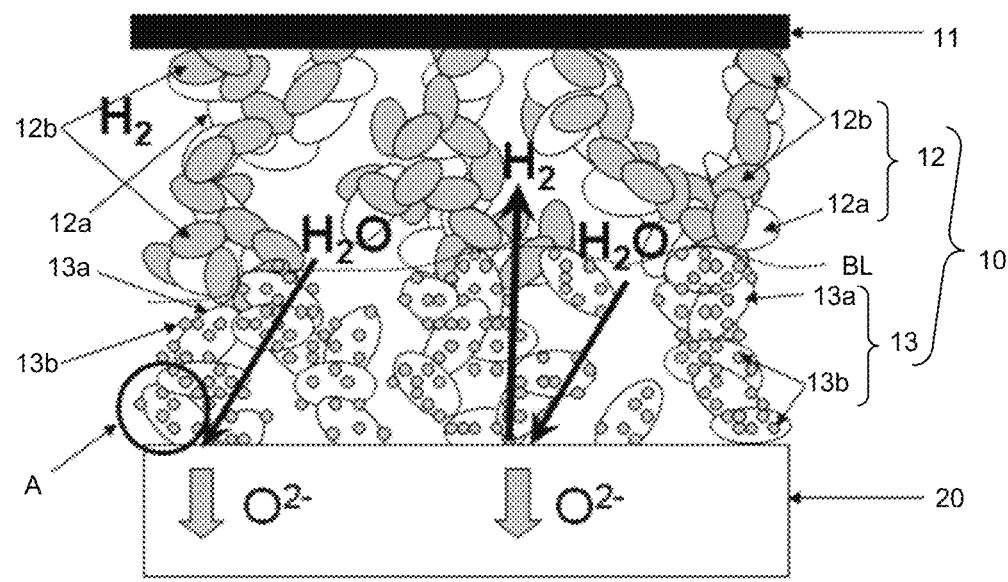
FIG. 2A shows one example of the hydrogen electrode structure of the electrolysis cell 1.

As shown in FIG. 2A, the hydrogen electrode 10 comprises a catalyst layer (CL) 13 and a current collecting layer (CCL) 12. In FIG. 2A, the border between the catalyst layer 13 and the current collecting layer 12 is shown as border line BL. The hydrogen electrode 10 is preferably double-layer type comprising the catalyst layer 13 and the current collecting layer 12 in terms of improving the current collection efficiently. When the current collecting layer 12 is not necessary, it can be omitted.

1-1-1. Catalyst Layer 13 of Hydrogen Electrode 10

The catalyst layer 13 of the hydrogen electrode 10 is composed of Ni-containing particles 13b being dispersed on a porous material 13a which is a mixed ionic and electronic conducting oxide. The effective reaction area of the catalyst layer 13 is enlarged by uniformly dispersing (i.e., highly dispersing) the Ni-containing particles 13b on the porous material 13a. The thickness of the catalyst layer 13 is preferably 10 to 20 μm, and 15 μm is more preferable.

<Mixed Ionic and Electronic Conducting Oxide>

As the mixed ionic and electronic conducting oxide, the ones shown by chemical formulas (H1) to (H7) can be mentioned. Chemical formula (H1) represents cerium oxide doped with rare earth or alkaline earth. Chemical formulas (H2) to (H3) represent composite oxide based on $LaCrO_3$, $LaFeO_3$, or $LaTiO_3$. The characters x, y, and z each represents a numerical value within the range specified by the chemical formulas (H1) to (H7), and is, for example, 0, 0.01, 0.1, 0.2, 0.3, 0.4, 0.5, 0.6, 0.7, 0.8, 0.9, 0.99, 1.0, 1.1, 1.2, 1.3, 1.4, 1.5, 1.6, 1.7, 1.8, 1.9, 1.99, and 2.0, and can be in the range between the two values exemplified herein. In each of the chemical formulas, δ represents oxygen deficiency or excess, which alter depending on the operation conditions.

$$(CeO_2)_{1-x}(MO_y)_x \tag{H1}$$

(Wherein, when y=1.5, M=Sm, Gd, Dy, Y, Ho, Yb, La, Nd, Eu, dope mixture of these, and 0<x<1 are satisfied. When y=1, M=Sr, Ca, or Ba, and 0<x<0.5 are satisfied.)

$$La_{1-x}A_x(M1)_{1-y-z}(M2)_y(M3)_zO_{3\pm\delta} \tag{H2}$$

(Wherein, A=Ca, Sr, Ba, M1=Fe, Cr, Ni, M2 or M3=Mn, Ni, Ti; and 0≤x≤1, 0≤y≤1, and 0≤z≤1, are satisfied.)

$$La_xA_{2-x}(M1)_{2-y}(M2)_yO_{6\pm\delta} \tag{H3}$$

(Wherein, A=Ca, Sr, Ba, M1=Fe, Cr, Ni, M2=Mo, Mn, Ni, Ti; and 0≤x≤2, and 0≤y≤2 are satisfied.)

$$SrTi_{1-x-y}Nb_xNi_yO_{3\pm\delta} \tag{H4}$$

(Wherein, 0≤x≤1 and 0≤y≤1 are satisfied.)

$$LaCo_{1-x}Ni_xO_{3\pm\delta} \tag{H5}$$

(Wherein, 0≤x≤1 is satisfied.)

$$(R_{1-x}A_x)_2Ti_2O_{7\pm\delta} \tag{H6}$$

(Wherein, A=Ca, Sr, R=Gd, Sm, Y, and 0≤x≤1 are satisfied.)

$$R_2(Ti_{1-x}M_x)_2O_{7\pm\delta} \tag{H7}$$

(Wherein, R=Gd, Sm, Y, M=Ru, Fe, Ni, Nb, and 0≤x≤1 are satisfied.)

The mixed ionic and electronic conducting oxide is preferably cerium-based composite oxide, and more preferably samaria-doped ceria (SDC) (one example of composition: $[CeO_2]_{0.8}[SmO_{1.5}]_{0.2}$) or gadolinia-doped ceria (GDC).

<Porous Material 13a>

The porosity of the porous material 13a is, for example, 40 to 80%, and is preferably 50 to 70%. When the porosity is too low, the surface area would become too small, and thus the catalyst performance may be insufficient. When the porosity is too high, mechanical strength may become insufficient. The porosity is, particularly for example, 40, 45, 50, 55, 60, 65, 70, 75, and 80%, and can be in the range between the two values exemplified herein.

The size of the particles which constitute the porous material 13a is preferably large so as to be capable of highly dispersing the Ni-containing particles 13b as the metal catalyst particle layer on its surface. Suitably, oxide particles having an average particle diameter of 0.5 μm (for example, SDC) is sintered at 1150° C. in air for 4 hours.

<Ni-Containing Particles 13b>

Ni-containing particles 13b are particles containing Ni, and Ni particles and Ni alloy particles can be mentioned. As the Ni alloy particles, Ni—Co (in one example, $Ni_{0.9}Co_{0.1}$) particles are preferable. Ni content of the Ni-containing particles is, for example, 50 to 100 atom %, and is particularly for example, 50, 55, 60, 65, 70, 75, 80, 85, 90, 95, 100 atom %, and can be in the range between the two values exemplified herein.

The average particle diameter of the Ni-containing particles 13b is, for example, 10 to 500 nm. When the average particle diameter is too small, the Ni-containing particles 13b are easily lost, and when the average particle diameter is too large, the catalyst performance can become insufficient. The average particle diameter can be calculated by using FIB-SIM image as shown in FIG. 10, measuring equivalent circle diameter of 200 or more of randomly selected Ni-containing particles 13b, and calculating the average of the measured values. The average particle diameter is, particularly for example, 10, 20, 30, 40, 50, 60, 70, 80, 90, 100, 150, 200, 250, 300, 350, 400, 450, 500 nm, and can be in the range between the two values exemplified herein.

The volume fraction of the Ni-containing particles 13b within the catalyst layer 13 (volume of Ni-containing particles 13b/apparent volume of catalyst layer 13) is preferably 6 to 20 volume %. This fraction is, particularly for example, 6, 7, 8, 9, 10, 11, 12, 13, 14, 15, 16, 17, 18, 19, 20 volume %, and can be in the range between the two values exemplified herein.

The Ni-containing particles 13b can be supported on the porous material 13a by impregnating porous material 13a with metal salt solution Ni or Ni alloy particles, followed by sintering to convert the metal salt into metal oxide, and then reducing it into the metal or metal alloy. As the metal salt, nitrate can be mentioned for example. Reduction of the metal oxide can be performed before operation of the electrolysis cell 1, or can be performed with hydrogen generated by operating the electrolysis cell 1 in water vapor electrolysis-mode.

The catalyst layer 13 preferably includes a stringed beads body which is formed by fusing and connecting a plurality of Ni-containing particles 13b like stringed beads. By adding the stringed beads body, initial performance of the hydrogen electrode can be improved, and degradation of the hydrogen electrode can be suppressed. As the Ni-containing particles 13b in the stringed beads form, Ni particles in the stringed beads form and Ni—Co particles in the stringed beads form can be mentioned. Here, the Ni-containing particles 13b in the stringed beads form can be supported on the porous material 13a by mixing the oxide thereof (for example, NiO or NiO—CoO with the stringed beads structure) with the porous material 13a, followed by sintering, and then their reduction.

Figure 2B:
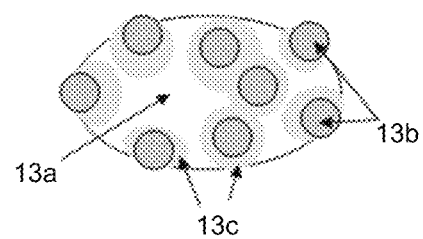
FIG. 2B is a detailed view of mixed ionic and electronic conducting cerium-based composite oxide with highly dispersed metal particle catalyst layer.

FIG. 2B shows one of the porous material 13a zooming in the region A of FIG. 2A. As shown in FIG. 2B, Ni-containing particles 13b are supported on the porous material 13a in a highly dispersed state. The vicinity of the contacting portion of the Ni-containing particles 13b and the porous material 13a acts as the effective reaction zone 13c (ERZ: Effective Reaction Zone). In the present embodiment, since the Ni-containing particles 13b are highly dispersed, the effective reaction zone 13c is larger than that of the conventional cermet electrodes (electrodes obtained merely by mixing and sintering metal particles of micrometer-size and YSZ or ceria based composite oxide).

Figure 3A:
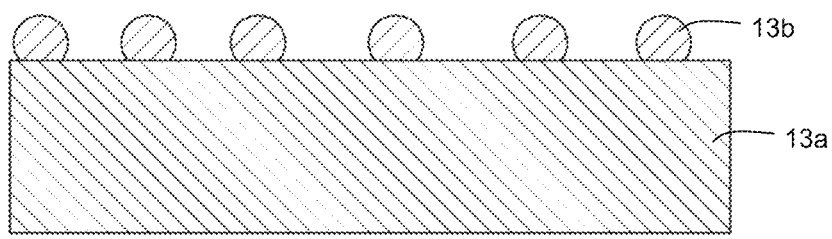
FIG. 3A is a schematic cross-sectional view showing the situation of the porous material 13a with Ni-containing particles 13b in the state before starting of the operation.

In a condition immediately after being manufactured by the afore-mentioned method (that is, in a condition before operation), as shown in FIG. 3A, a large number of small Ni-containing particles 13b are supported on the porous material 13a, and the oxide material 13a has not climbed up the side surface of the Ni-containing particles 13b. In such a condition, the Ni-containing particles 13b are relatively unstable, and when the water vapor electrolysis operation is carried out continuously for a long time, the mass of the Ni-containing particles 13b decreases, and the hydrogen electrode 10 degrades. The average particle diameter of the Ni-containing particles 13b immediately after being manufactured is, for example, 10 to 100 nm, preferably 20 to 80 nm, and is particularly for example, 10, 20, 30, 40, 50, 60, 70, 80, 90, 100 nm, and can be in the range between the two values exemplified herein.

Figure 3B:
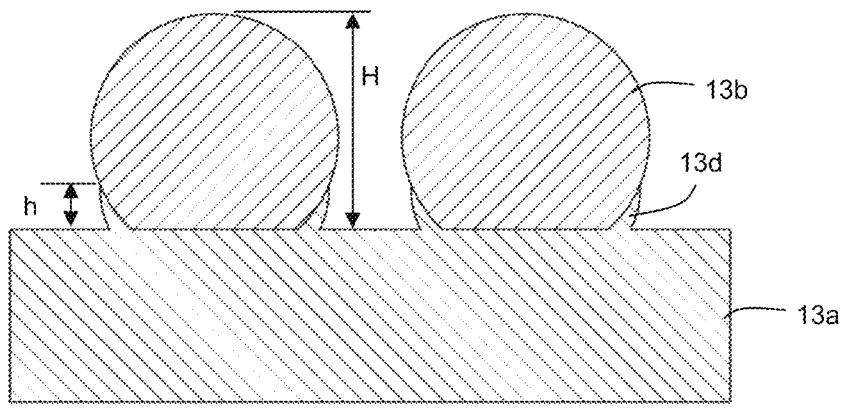
FIG. 3B is a schematic cross-sectional view showing the state of Ni-containing particles 13b on the porous material 13a after alternating operation.

On the other hand, when the electrolysis cell 1 is operated so as to perform alternating operation by alternately repeating the water vapor electrolysis operation and the fuel cell operation (details of the alternating operation will be explained later), as shown in FIG. 3B, the Ni-containing particles 13b aggregate and becomes enlarged, and the oxide structuring the porous material 13a climbs up the side surface of the Ni-containing particles 13b, thereby forming a climbing portion 13d. The climbing portion 13d is formed in a bowl-like shape. By the formation of the climbing portion 13d, the Ni-containing particles 13b become anchored in the porous material 13a. Accordingly, the bond becomes firmer, and the region of the three phase interface constituted by the Ni-containing particles 13b, the porous material 13a, and the gas phase is expanded, and thus the reaction rate is facilitated. Once the anchored structure shown in FIG. 3B is formed by the alternating operation, the degradation of the hydrogen electrode 10 will be suppressed thereafter, even when the continuous operation of the water vapor electrolysis is performed. That is, the hydrogen electrode 10 is stabilized by the alternating operation.

In the illustration of FIG. 3B, the average particle diameter of the Ni-containing particles 13b is, for example, 100 to 500 nm, preferably 200 to 400 nm, and is particularly for example, 100, 150, 200, 250, 300, 350, 400, 450, 500 nm, and can be in the range between the two values exemplified herein. Here, in FIG. 3B, when the maximum height from the interface between the porous material 13a and the Ni-containing particles 13b to the Ni-containing particles 13b is taken as H, and the maximum height from the interface to the climbing portion 13d is taken as h, the buried height fraction of the Ni-containing particles can be represented as h/H. The average buried height fraction is an average value of h/H for 200 or more of randomly selected h/H in the FIB-SIM image shown in FIG. 10. The average buried height fraction is preferably 0.1 or higher. Further, the number fraction of the Ni-containing particles 13b having h/H of 0.2 or more is preferably 50% or higher. The average buried height fraction is preferably 0.2 or higher, more preferably 0.25 or higher, further preferably 0.3 or higher, and even preferably 0.35 or higher. The average buried height fraction is, for example, 0.1 to 0.6, and is particularly for example, 0.1, 0.15, 0.2, 0.25, 0.3, 0.35, 0.4, 0.45, 0.5, 0.55, 0.6, and can be in the range between the two values exemplified herein. The number fraction is, for example, 50 to 100%, and is particularly for example, 50, 55, 60, 65, 70, 75, 80, 85, 90, 95, 100%, and can be in the range between the two values exemplified herein.

1-1-2. Current Collecting Layer 12 of Hydrogen Electrode 10

The current collecting layer 12 of the hydrogen electrode 10 comprises substrate particles 12a and Ni-containing particles 12b. The substrate particles 12a are, in one example, composed of yttria-stabilized zirconia (YSZ), while it may be composed of oxides similar to the porous material 13a (for example, SDC). Explanation for the composition of the Ni-containing particles 12b is the same as the Ni-containing particles 13b. The average particle diameter of the substrate particles 12a is preferably 0.5 to 2 times (more preferably 0.8 to 1.5 times) of the average particle diameter of the Ni-containing particles 12b. The average particle diameter of the Ni-containing particles 12b is, for example, 0.3 to 1.5 μm, preferably 0.5 to 1 μm. The current collecting layer 12 can be obtained by mixing and sintering the oxide of the Ni-containing particles 12b and the substrate particles 12a, followed by the reduction of the oxide of the Ni-containing particles 12b. The sintering temperature is, for example, 1000 to 1300° C., preferably 1100 to 1200° C., and further preferably 1150° C. The reduction can be performed, for example, by using hydrogen gas. The volume fraction of the Ni-containing particles 12b within the current collecting layer 12 (volume of Ni-containing particles 12b/apparent volume of current collecting layer 12) is preferably 40 to 60 volume %. This fraction is, particularly for example, 40, 45, 50, 55, 60 volume %, and can be in the range between the two values exemplified herein. The thickness of the current collecting layer 12 is preferably 5 to 20 µm, more preferably 5 to 10 µm.

1-1-3. Double-Layered Structure of Hydrogen Electrode 10

The double-layered structure of the hydrogen electrode 10 is preferably constructed with a catalyst layer of SDC having highly dispersed Ni—Co and a current collecting layer of Ni-YSZ. However, it may also be constructed with a catalyst layer of SDC having highly dispersed Ni and a current collecting layer of Ni-YSZ, a catalyst layer of SDC having highly dispersed Ni—Co and a current collecting layer of Ni-SDC, a catalyst layer of SDC having highly dispersed Ni and a current collecting layer of Ni-SDC and the like. Further, it may also be constructed with a catalyst layer of GDC having highly dispersed Ni—Co and a current collecting layer of Ni-YSZ, a catalyst layer of GDC having highly dispersed Ni and a current collecting layer of Ni-YSZ, a catalyst layer of GDC having highly dispersed Ni—Co and a current collecting layer of Ni-SDC, a catalyst layer of GDC having highly dispersed Ni and a current collecting layer of Ni-SDC and the like.

1-1-4. Hydrogen Electrode Separator 11

The hydrogen electrode separator 11 collects current by contacting with the hydrogen electrode 10. The hydrogen electrode 10 is arranged in between the hydrogen electrode separator 11 and the electrolyte layer 20. The hydrogen electrode separator 11 is utilized to connect the electrolysis cells 1 in series, and can be composed of an electronically conductive material (heat resistant alloy or electronic conducting ceramics).

1-2. Electrolyte Layer 20

The electrolyte layer 20 is sandwiched between the hydrogen electrode 10 and the oxygen electrode 30. When observed from the hydrogen electrode 10 side, it is structured so that the catalyst layer 13 side of the hydrogen electrode 10 comes into contact with the electrolyte layer 20. Regarding the electrolyte layer 20, a material which can conduct oxide ions ($O^{2-}$) with electronically insulating property is selected. For example, yttria-stabilized zirconia (YSZ), scandia-stabilized zirconia (ScSZ) and the like can be used.

1-3. Oxygen Electrode 30

The oxygen electrode 30 can have a single-layered structure of the catalyst layer or can have a double-layered structure of the catalyst layer and the current collecting layer. When the oxygen electrode has the double-layered structure, the catalyst layer is arranged at the electrolyte layer 20 side.

1-3-1. Catalyst Layer of Oxygen Electrode 30

The catalyst layer of the oxygen electrode 30 is composed of a porous oxide material. The porosity of the porous material is, for example, 40 to 80%, preferably 50 to 70%. When the porosity is too small, gas diffusivity becomes poor, and the effective reaction surface area would become too small, resulting in insufficient catalytic performance. When the porosity is too large, the mechanical strength may become insufficient. The porosity is, particularly for example, 40, 45, 50, 55, 60, 65, 70, 75, 80%, and can be in the range between the two values exemplified herein.

As the base oxide material for the catalyst layer, mixed ionic and electronic conducting oxide such as generally known LSC (lanthanum strontium cobalt oxide), LSCF (lanthanum strontium cobalt iron oxide), $LaMnO_3$ (lanthanum manganese oxide) and the like can be used, however, the base oxide is not limited to these, and can be the one having the constitution shown by the following chemical formulas (O1) to (O10). Chemical formulas (O1) to (O6) show composite oxide based on $LaCoO_3$, $LaMnO_3$, $LaTiO_3$, $SrTiO_3$, and $LaNiO_3$. Here, x and y each represents, for example, 0, 0.01, 0.1, 0.2, 0.3, 0.4, 0.5, 0.6, 0.7, 0.8, 0.9, 0.99, 1.0, and can be in the range between the two values exemplified herein.

  (O1)

  (O2)

  (O3)

  (O4)

  (O5)

  (O6)

  (O7)

  (O8)

  (O9)

  (O10)

(Wherein, A=Ca, Sr, Ba, Ln=La, Pr, M=Fe, Co, 0≤x≤1, 0≤y≤1 are satisfied, and δ represents oxygen deficiency or excess.)

The catalyst layer preferably contains the afore-mentioned base oxide and the ion conductive oxide. By such, effective reaction zone (triple phase boundary) where gas-ion-electron meet together can be enlarged, thereby achieving an effect to facilitate the electrode reaction rate. As the ion conductive oxide, cerium based oxide and zirconium based oxide can be mentioned.

The catalyst layer can be formed by screen printing method, doctor blade method or spray method.

1-3-2. Current Collecting Layer of Oxygen Electrode 30

The current collecting layer of the oxygen electrode 30 can be formed with the aforementioned base oxide. The current collecting layer can be formed in a similar manner as the forming method of the catalyst layer, such as screen printing method, doctor blade method or spray method for example.

1-3-3. Oxygen Electrode Separator 31

The oxygen electrode separator 31 collects current by contacting with the oxygen electrode 30. The oxygen electrode 30 is arranged in between the oxygen electrode separator 31 and the electrolyte layer 20. The oxygen electrode separator 31 is utilized to connect the electrolysis cells 1 in series, and can be composed of an electronically conductive material (heat resistant alloy or electronic conductive ceramics).

1-4. Other Constituents

An interlayer can be provided between the hydrogen electrode 10 and the electrolyte layer 20, and between the oxygen electrode 30 and the electrolyte layer 20. Accordingly, solid phase reaction of the oxygen electrode 30 with the electrolyte layer 20 can be suppressed, and degradation of the electrolyte layer 20 can be prevented. As the interlayer, cerium-based composite oxide can be suitably used. Since the cerium-based composite oxide is superior in ion conductivity, transfer of the oxide ion from the hydrogen electrode 10 to the oxygen electrode 30 through the electrolyte layer 20 can be facilitated. In addition, by inserting the interlayer with thinner film thickness than that of the hydrogen electrode between the electrolyte layer 20 and the hydrogen electrode 10, contact can be improved.

2. Operation of Electrolysis Cell 1

The electrolysis cell 1 operates as the water vapor electrolysis cell (SOEC: Solid Oxide Electrolysis Cell) by the electric power supplied from external power supply. In such a case, water vapor is electrolyzed to generate hydrogen gas and oxide ion at the hydrogen electrode 10, and the electron of the oxide ion which passed through the electrolyte layer 20 is discharged at the oxygen electrode 30, thereby generating oxygen gas at the oxygen electrode 30 (water vapor electrolysis reaction/water vapor electrolysis operation). Here, the temperature of the water vapor applied is preferably close to the operating temperature of the cell, and is for example, 500 to 1000° C., preferably 750 to 850° C. The temperature is, particularly for example, 500, 550, 600, 650, 700, 750, 800, 850, 900, 950, 1000° C., and can be in the range between the two values exemplified herein. When the temperature of the water vapor is too low, the amount of electric power required for electrolysis becomes large, and when the temperature of the water vapor is too high, degradation of the hydrogen electrode 10 would be accelerated.

On the other hand, the afore-mentioned electrolysis cell 1 can be utilized as the solid oxide fuel cell (SOFC: Solid Oxide Fuel Cell) by changing the direction of the reaction (direction of current). In order to utilize the electrolysis cell as SOFC, load is connected between the hydrogen electrode 10 and the oxygen electrode 30. When the electrolysis cell is operated as SOFC, oxygen is reduced to oxide ion at the oxygen electrode 30, and the oxide ion which passed through the electrolyte layer 20 is allowed to react with hydrogen as fuel at the hydrogen electrode 10, thereby performing power generation (fuel cell reaction/fuel cell operation).

3. Alternating Operation of Electrolysis Cell 1

The method for operating the electrolysis cell 1 according to one embodiment of the present invention comprises an alternating operation step to alternately repeat the water vapor electrolysis operation and the fuel cell operation.

The condition of the hydrogen electrode 10 immediately after production is unstable, and when water vapor electrolysis operation is carried out continuously, the mass of the Ni-containing particles 13b decreases, and the hydrogen electrode 10 degrades. On the other hand, when the hydrogen electrode 10 immediately after production is subjected to the alternating operation, degradation of the hydrogen electrode 10 during the alternating operation is suppressed, and the hydrogen electrode 10 is stabilized by the alternating operation. Therefore, after the alternating operation, the degradation rate of the hydrogen electrode 10 will be suppressed, even when the continuous operation of the water vapor electrolysis is performed.

When the time for water vapor electrolysis operation and the time for fuel cell operation within one cycle of the alternating operation are represented as T1 and T2, respectively, and [T1/(T1+T2)] is represented as electrolysis operation time fraction P, the fraction P is, for example, 0.1 to 0.95, preferably 0.3 to 0.9. When this fraction is too small, the amount of hydrogen generated by the water vapor electrolysis may become too small. When this fraction is too large, there are cases where suppression of degradation of the hydrogen electrode 10 is not sufficient. This fraction is, particularly for example, 0.1, 0.2, 0.3, 0.4, 0.5, 0.6, 0.7, 0.8, 0.9, 0.95, and can be in the range between the two values exemplified herein.

The water vapor electrolysis operation time in one cycle of the alternating operation is, for example, 0.5 to 100 hours, preferably 1 to 50 hours, more preferably 2 to 25 hours, and further preferably 3 to 20 hours. When this operation time is too short, the amount of hydrogen generated by the water vapor electrolysis may become too small. When this operation time is too long, degradation of the hydrogen electrode 10 tends to proceed easily. The operation time is, particularly for example, 0.5, 1, 2, 3, 4, 5, 6, 7, 8, 9, 10, 11, 12, 13, 14, 15, 20, 25, 50, 100 hours, and can be in the range between the two values exemplified herein.

The time for one cycle of the alternating operation is, for example, 1 to 200 hours, preferably 2 to 100 hours, and more preferably 3 to 30 hours. When the one cycle is too short, the loss during switching of the operation may become too large. When the one cycle is too long, the water vapor electrolysis operation would be continuously operated for a long time, and thus degradation of the hydrogen electrode 10 tends to proceed easily. The time for one cycle is, particularly for example, 1, 2, 5, 10, 15, 20, 25, 30, 50, 100, 200 hours, and can be in the range between the two values exemplified herein.

When the period beginning from the start of the operation of the electrolysis cell 1 is referred to as the aging time, and the period beginning from the end of the aging time is referred to as the operating time, the electrolysis operation time fraction P1 during the aging time is preferably smaller than the electrolysis operation time fraction P2 during the operating time. In the aging time, the operating conditions are set so that the fraction P becomes small in order to facilitate stabilization of the hydrogen electrode 10 by alternating operation of the electrolysis cell 1. In the operating time, the operating conditions are set so that the fraction P becomes large in order to increase the amount of hydrogen generated by the water vapor electrolysis.

Preferable range of the fraction P1 is as mentioned for the fraction P as above. Preferable range of fraction P2 is, for example, 0.2 to 1, and is for example, 0.2, 0.3, 0.4, 0.5, 0.6, 0.7, 0.8, 0.9, 1.0. When the fraction P2 is 1, the water vapor electrolysis operation is operated continuously. Since the hydrogen electrode 10 is stabilized by the alternating operation during the aging period, even when the fraction P2 in the later operating period is made large or when the water vapor electrolysis operation is performed continuously, degradation of the hydrogen electrode 10 is suppressed. The difference between fraction P1 and fraction P2 is, for example, 0.1 to 0.9, and is particularly for example, 0.1, 0.2, 0.3, 0.4, 0.5, 0.6, 0.7, 0.8, 0.9, and can be in the range between the two values exemplified herein.

The length of the aging period is 50 hours or longer, preferably 100 hours or longer, and more preferably 200 hours or longer. When the aging period is too short, stabilization of the hydrogen electrode 10 may be insufficient. When the aging period is too long, the amount of hydrogen generated by water vapor electrolysis may become too small. The length of the aging period is, for example, 50 to 1000 hours, and is particularly for example, 50, 100, 150, 200, 250, 300, 500, 1000 hours, and can be in the range between the two values exemplified herein.

The current density during the alternating operation is, for example, 0.1 to 1.0 $A \cdot cm^{-2}$, more preferably 0.2 to 0.8 $A \cdot cm^{-2}$. The current density is, particularly for example, 0.1, 0.2, 0.3, 0.4, 0.5, 0.6, 0.7, 0.8, 0.9, 1.0 $A \cdot cm^{-2}$, and can be in the range between the two values exemplified herein.

3. Solid Oxide Electrolysis Cell System

The solid oxide electrolysis cell system according to one embodiment of the present invention comprises a control system which controls the afore-mentioned method for operation. According to such system, the degradation of the hydrogen electrode 10 can be suppressed. Further, such solid oxide electrolysis cell system can be used to level the power from renewable energy generation such as solar power generation, wind power generation and the like in which the output fluctuate greatly.

EXAMPLES

1. Comparative Example 1 (Continuous Operation of Electrolysis Cell 1)

In Comparative Example 1, the electrolysis cell 1 was operated continuously in water vapor electrolysis operation mode.

The electrolysis cell 1 was constructed by using Ni-YSZ current collecting layer as the current collecting layer 12 of the hydrogen electrode 10, SDC catalyst layer with highly dispersed Ni-containing particles 13b as the catalyst layer 13, and LSCF-SDC as the oxygen electrode. As the electrolyte layer 20 which is sandwiched between the hydrogen electrode 10 and the oxygen electrode 30, YSZ was used, and an interlayer comprising SDC was formed between the oxygen electrode 30 and the electrolyte layer 20. Further, as the Ni-containing particles 13b, Ni—Co having a composition ratio of $Ni_{0.9}Co_{0.1}$ was used, and the amount being supported was 7.2 volume %. In order to improve the electronic conductivity in the catalyst layer 13, Ni in a stringed beads form or $Ni_{0.8}Co_{0.2}$ in a stringed beads form was added by 10 volume %. Here, in this experiment, a current collecting mesh was provided to the electrolysis cell 1 in place of the separator. In actual practice, cells are stacked in series by using the separator.

Regarding the oxygen electrode 30, LSCF-SDC which is a mixture of LSCF and SDC was used. Here, the composition of samaria-doped ceria (SDC) for the catalyst layer 13 of hydrogen electrode 10 was $(CeO_2)_{0.8}(SmO_{1.5})_{0.2}$. The composition of LSCF for the oxygen electrode 30 was $La_{0.6}Sr_{0.4}Co_{0.2}Fe_{0.8}O_3$. The volume fraction of SDC in the oxygen electrode was 40 volume %.

The hydrogen electrode 10 thus prepared can achieve both of high initial performance and durability, and was able to operate with high performance even at 750° C. Here, addition of Ni in the stringed beads form or Ni—Co in the stringed beads form by 10 volume % was effective in improving electronic conductivity in the catalyst layer 13.

Figure 4:
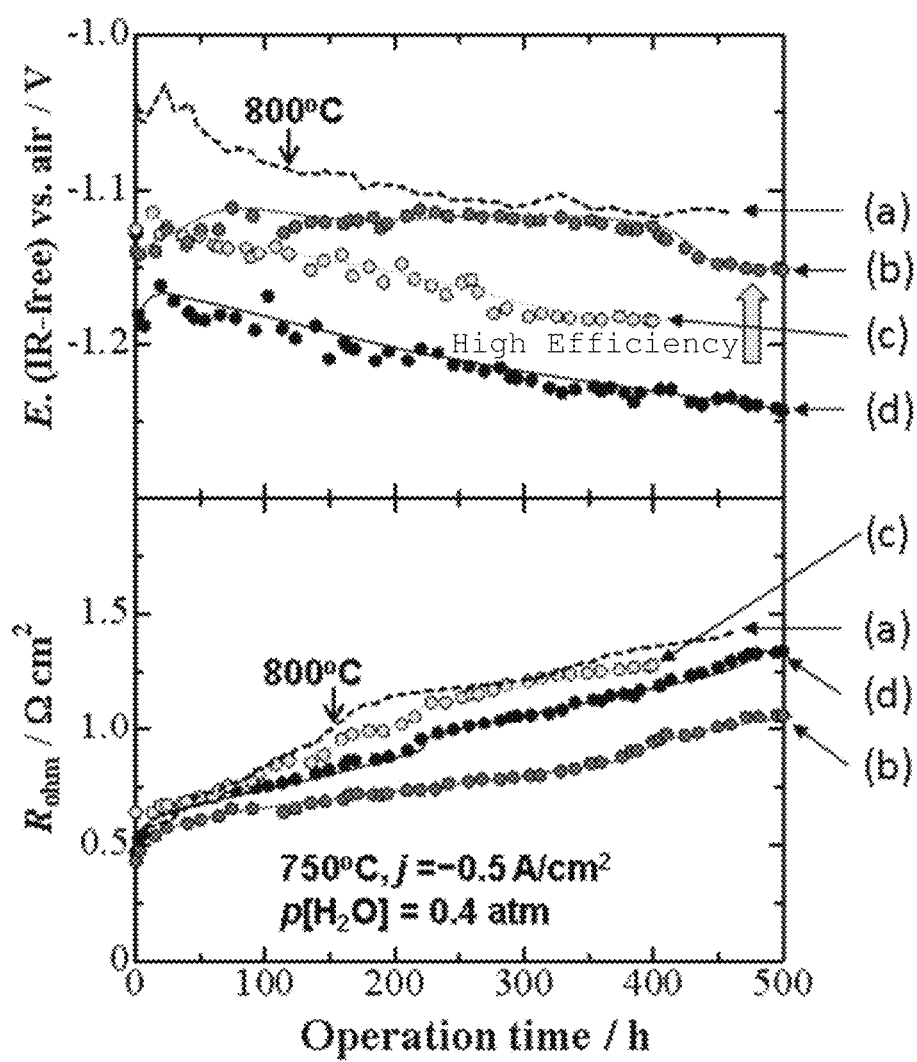
FIG. 4 shows the relationship between the potential E and the ohmic resistance $R_{ohm}$ during continuous electrolysis operation of the cell 1.

FIG. 4 shows changes in the potential E (V), ohmic resistance $R_{ohm}$ ($\Omega cm^2$) with the operation time (h) when the electrolysis cell 1 thus prepared was subjected to continuous water vapor electrolysis operation. In FIG. 4, (a) to (d) represent the results obtained by the conditions shown in Table 1. Potential (E) represents E(IR-free) vs air (V).

TABLE 1

| conditions | current collector mesh | Ni-containing particles in stringed beads form | operation temperature (° C.) |
|---|---|---|---|
| (a) | Pt | Ni | 800 |
| (b) | Ni | $Ni_{0.8}Co_{0.2}$ | 750 |
| (c) | Pt | $Ni_{0.8}Co_{0.2}$ | 750 |
| (d) | Pt | Ni | 750 |

As apparent from FIG. 4, compared with the case of operation temperature of 800° C. (condition (a)), the initial degradation rate of hydrogen electrode 10 was suppressed at 750° C. (conditions (b) to (d)). However, after about 200 hours, the ohmic resistance $R_{ohm}$ rapidly increased (condition (d)). As a result of observation of microstructural changes, it became apparent that the composition of Ni—Co nanoparticles of the catalyst layer 13 was unchanged even when the particle diameter became large to some extent. However, the amount of Ni in the stringed beads form added was significantly reduced. Accordingly, when Ni—Co in the form of stringed beads was newly synthesized and was added to the catalyst layer 13 (condition (c)), the initial performance was improved, but the improvement in durability was scarcely observed. On the other hand, in view of practical use, when the current collector was changed from conventional Pt mesh (80 mesh) to Ni mesh (200 mesh), it became clear that initial performance and durability were improved significantly (condition (b)). This can be understood that Ni mesh current collector having more fine mesh than the Pt mesh can enlarge the effective reaction zone (ERZ) by collecting current uniformly. Accordingly, when the double-layered hydrogen electrode of the present invention is used, the initial performance and durability can be improved. However, when the water vapor electrolysis operation was performed continuously, the potential of the hydrogen electrode shifted in the negative direction, and the ohmic resistance increased.

2. Example 1 (SOEC/SOFC Alternating Operation of Electrolysis Cell 1)

When SOEC is inversely operated as mentioned above, it can be operated as SOFC which can generate power with high efficiency by using stored hydrogen as fuel. In Example 1, the electrolysis cell 1 with the condition (b) as mentioned in "1. Continuous Operation of Electrolysis Cell 1" was used, and SOEC/SOFC alternating operation (hereinafter referred to as [alternating operation]) was performed.

Figure 7:
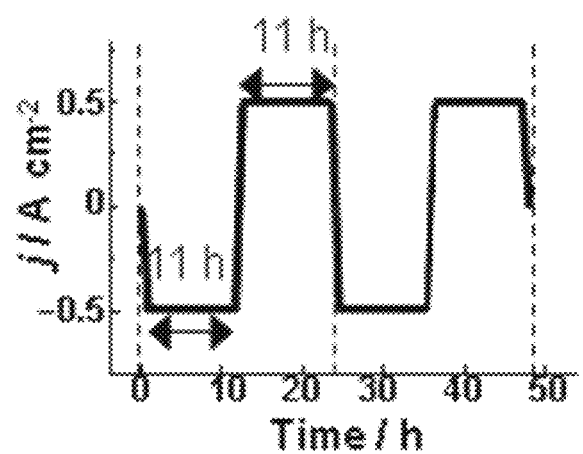
FIG. 7 shows SOEC/SOFC alternating operation conditions.

In the alternating operation, as shown in FIG. 7, the absolute value of the current density was set at 0.5 $A \cdot cm^{-2}$, and each retention time was 11 hours. The change rate of the current density was set at 1 $A \cdot cm^{-2} h^{-1}$, and the operation was performed by 24 hours per 1 cycle. The operation temperature was set at 800° C. in order to facilitate degradation of the hydrogen electrode.

Figure 5:
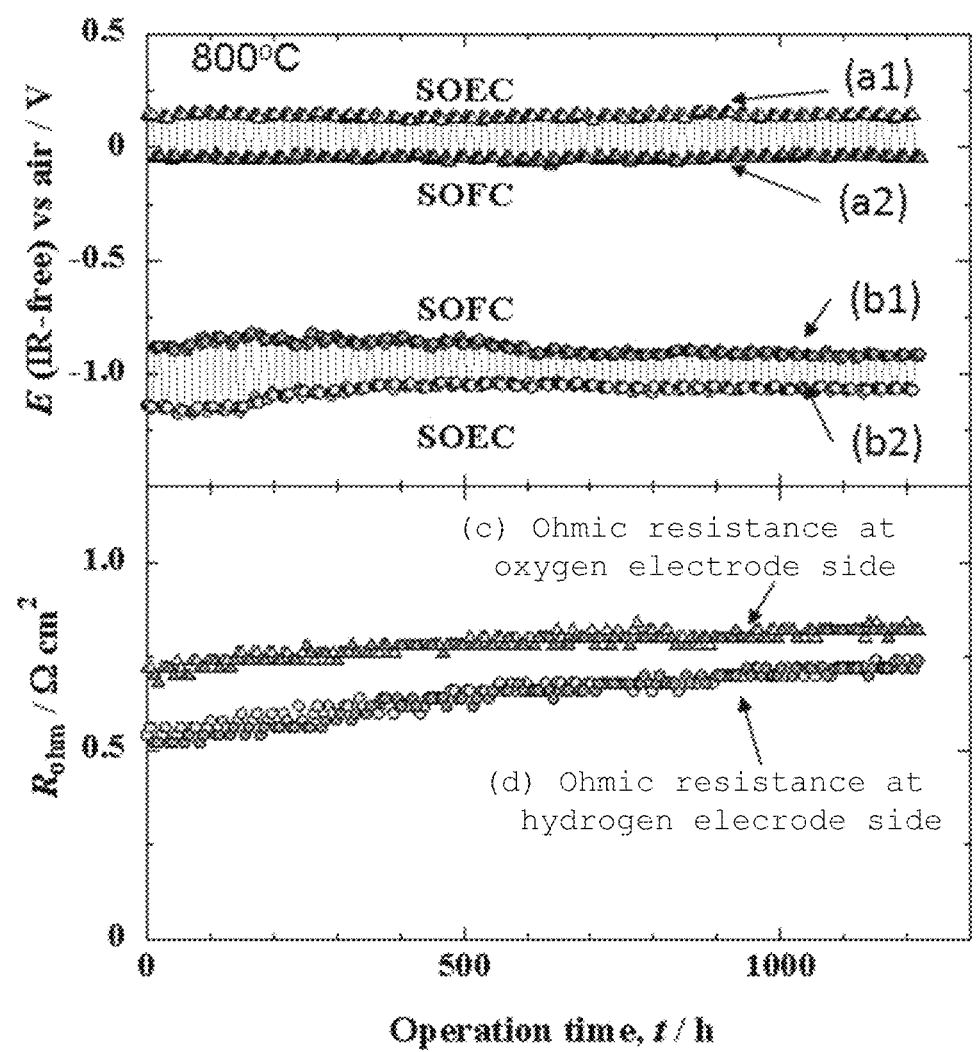
FIG. 5 shows the results of alternating operation.

The result of alternating operation is shown in FIG. 5. The upper panel of FIG. 5 shows changes in the potential E of the oxygen electrode and the hydrogen electrode with the operation time when electrolysis cell 1 is subjected to alternating operation. The lower panel of FIG. 5 shows changes in the ohmic resistance $R_{ohm}$ with the operation time.

In the upper panel of FIG. 5, (a1) shows the result of the oxygen electrode 30 in SOEC operation mode and (a2) shows that in SOFC operation mode, while (b1) shows the result of the hydrogen electrode 10 in SOFC operation mode and (b2) shows that in SOEC operation mode.

In the lower panel of FIG. 5, (c) and (d) represent the ohmic resistance at the oxygen electrode 30 side and that at the hydrogen electrode 10 side, respectively. Here, (c) and (d) include results obtained in both of the SOEC/SOFC modes. There is only scarce difference in these values.

As apparent from the upper panel of FIG. 5, the potential E was stable for both of the oxygen electrode 30 and the hydrogen electrode 10 in both modes of SOEC and SOFC. In SOEC, the hydrogen electrode potential E ((b2) in upper panel of FIG. 5) shifted in the positive direction, indicating that the performance was rather improved. The ohmic resistance $R_{ohm}$ ((c) and (d) in FIG. 5) was extremely stable up to 1200 hours, except for a slight increase during the initial stage was observed with the ohmic resistance $R_{ohm}$ ((d) in FIG. 5) for the hydrogen electrode 10.

Changes in potential E and $R_{ohm}$ with time during SOEC mode in alternating operation were compared with those during SOEC continuous operation. Results are shown in FIG. 6.

Figure 6:
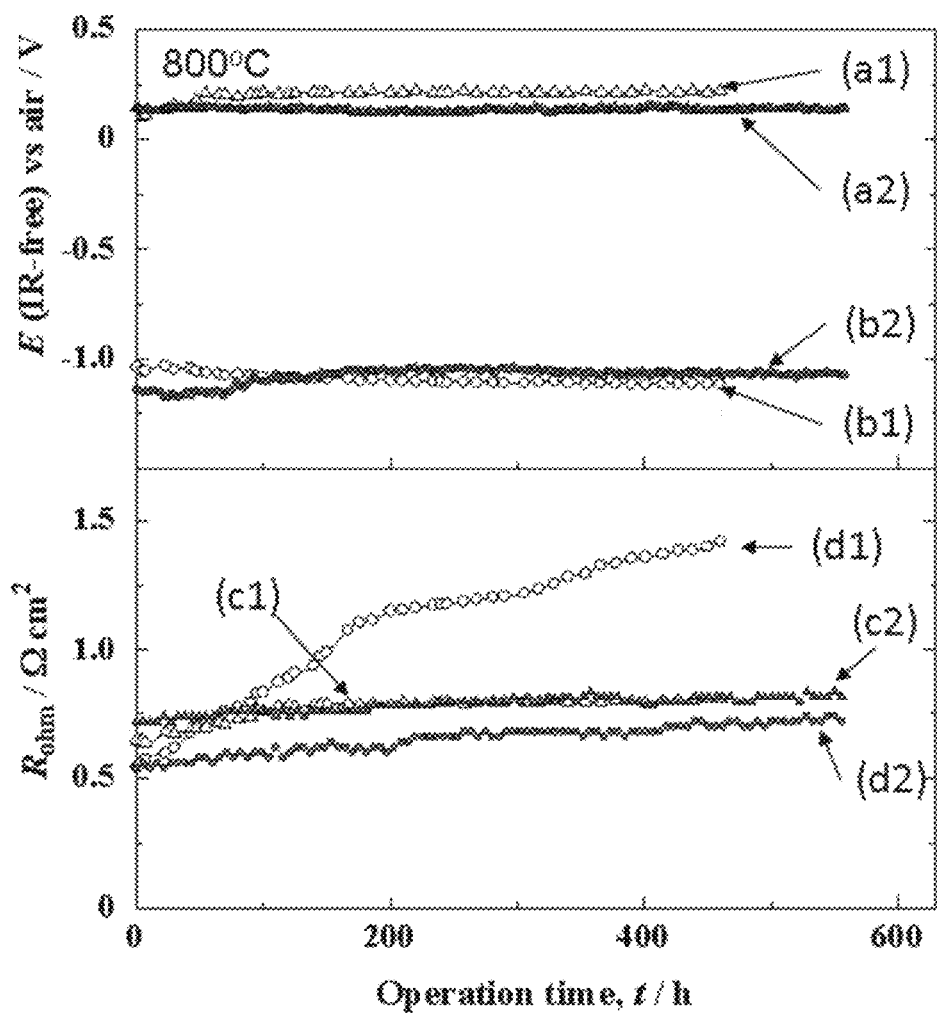
FIG. 6 shows comparison between the changes in potential E and $R_{ohm}$ over time in SOEC mode and those in continuous SOEC operation.

Here, the operation time in FIG. 6 is shown for the actual time operated as SOEC at $-0.5$ A·cm$^{-2}$. (a1) shows the potential E of the oxygen electrode 30 at continuous SOEC operation, and (a2) shows that in alternating operation. (b1) shows the potential E of the hydrogen electrode 10 at continuous SOEC operation, and (b2) shows that in alternating operation. Also, (c1) shows the ohmic resistance $R_{ohm}$ of the oxygen electrode at continuous SOEC operation, and (c2) shows that in alternating operation. (d1) shows the ohmic resistance $R_{ohm}$ of the hydrogen electrode at continuous SOEC operation, and (d2) shows that in alternating operation.

From the results of (a1) to (d2) in FIG. 6, it was found that the degradation of the hydrogen electrode 10 was significantly suppressed by the alternating operation, compared with the continuous operation. On the other hand, the potential E and ohmic resistance $R_{ohm}$ of the oxygen electrode 30 showed scarce difference in the alternating operation and continuous operation, and the degradation rate was negligibly slow.

It has been reported that the degradation of $La_{1-x}Sr_xMnO_3$ (LSM: low reversibility compared with LSCF-SDC of the present Example) oxygen electrode was suppressed by alternating operation (non-patent literature 3). However, a marked suppression of degradation of the hydrogen electrode has been achieved for the first time by the present invention.

As discussed above, it is clarified that the degradation of the hydrogen electrode 10 is able to be suppressed by the alternating operation. Here, in order to improve the efficiency, the hydrogen electrode 10 preferably has a double-layered structure of the catalyst layer 13 and the current collecting layer 12. However, even when electrolysis cell 1 is constructed by using the hydrogen electrode 10 without the current collecting layer 12, the degradation of the hydrogen electrode 10 can be suppressed by alternating operation.

3. Example 2 to 3 (Change in the Condition of Alternating Operation)

The alternating operation was performed in a similar manner as Example 1, except that the operation conditions were changed as shown in Table 2. Changes in the ohmic resistance $R_{ohm}$ of the hydrogen electrode with time were measured. Results are shown in FIG. 8.

TABLE 2

| | Example | | |
|---|---|---|---|
| | 1 | 2 | 3 |
| 1 cycle (h) | 24 | 8 | 24 |
| water vapor electrolysis operation time T1 (h) | 11 | 5 | 15 |
| fuel cell operation T2 (h) | 11 | 1 | 7 |
| T1/(T1 + T2) | 0.50 | 0.83 | 0.68 |
| total operation time (h) | 1200 | 350 | 900 |

Figure 8:
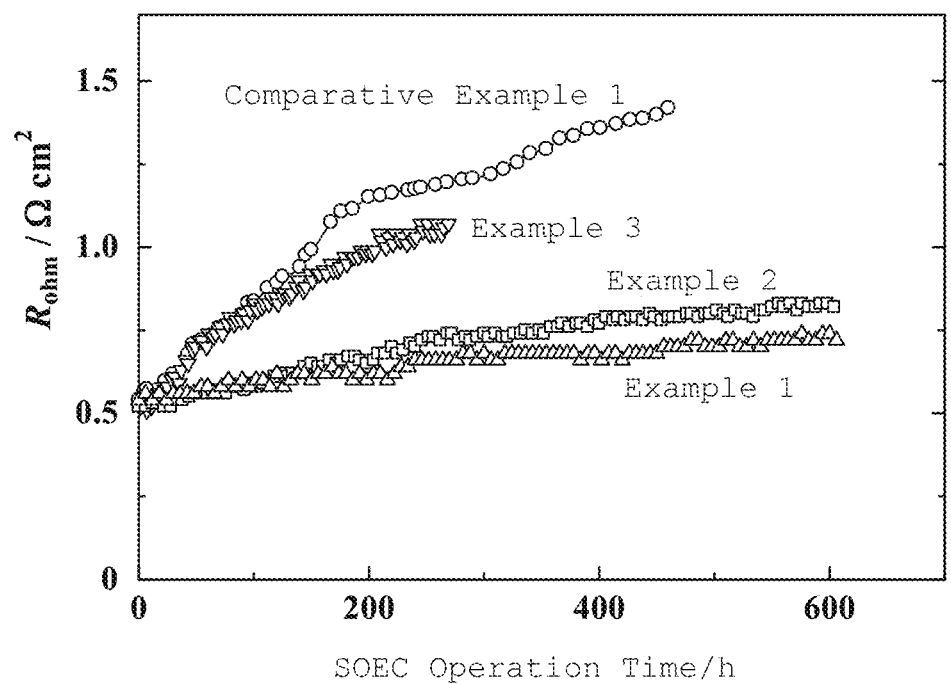
FIG. 8 is a graph showing the change in $R_{ohm}$ over time for Comparative Example 1 and Examples 1 to 3.

As shown in FIG. 8, in any one of Examples 1 to 3, the degradation of the hydrogen electrode 10 was suppressed compared with the case of the continuous SOEC operation of Comparative Example 1. Further, it was clarified that suppression of degradation of the hydrogen electrode 10 was prominent as the value of T1/(T1+T2) becomes smaller.

3. Example 4 (Continuous Operation After Alternating Operation)

In Example 4, an alternating operation was started with similar conditions as Example 1, and after elapse of 360 hours, a water vapor electrolysis operation was performed continuously. Results are shown in FIG. 9.

Figure 9:
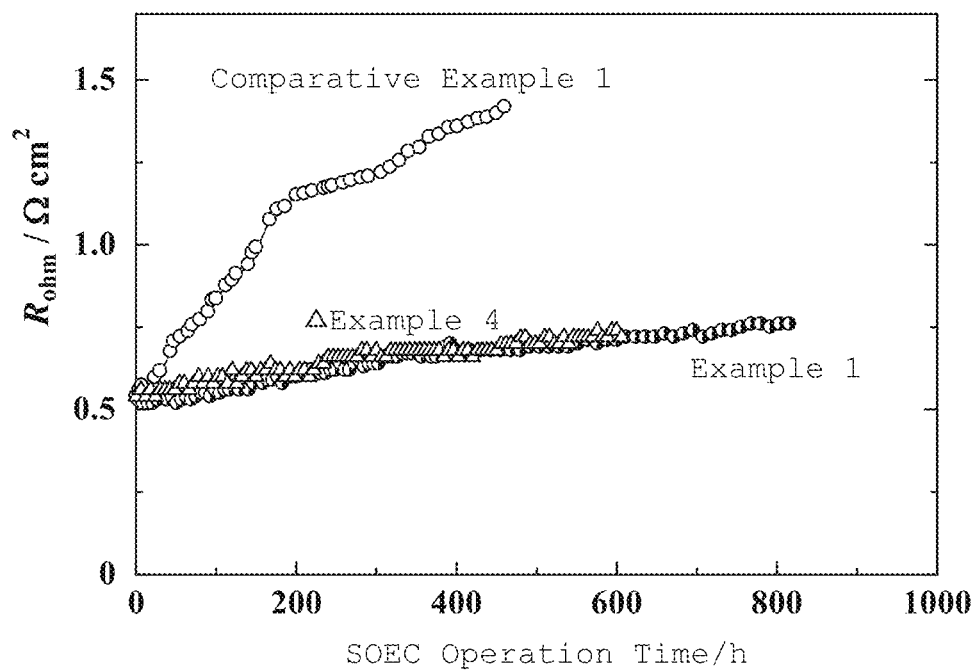
FIG. 9 is a graph showing the change in $R_{ohm}$ over time for Comparative Example 1 and Example 4.

As shown in FIG. 9, it was found that even when water vapor electrolysis operation was performed continuously after performing the alternating operation, the degradation of the hydrogen electrode 10 was suppressed. This result shows that, since the hydrogen electrode 10 was stabilized by the alternating operation, the degradation was mitigated even when water vapor electrolysis operation was performed continuously.

Figure 10A:
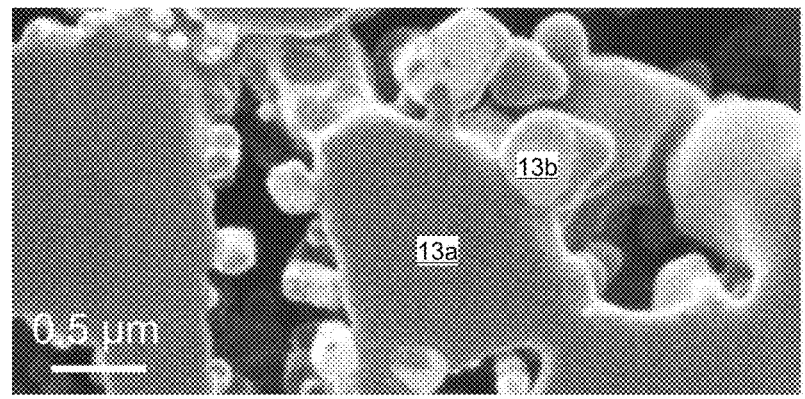
FIG. 10A shows a FIB-SIM image of the catalyst layer in a condition before starting operation.
Figure 10B:
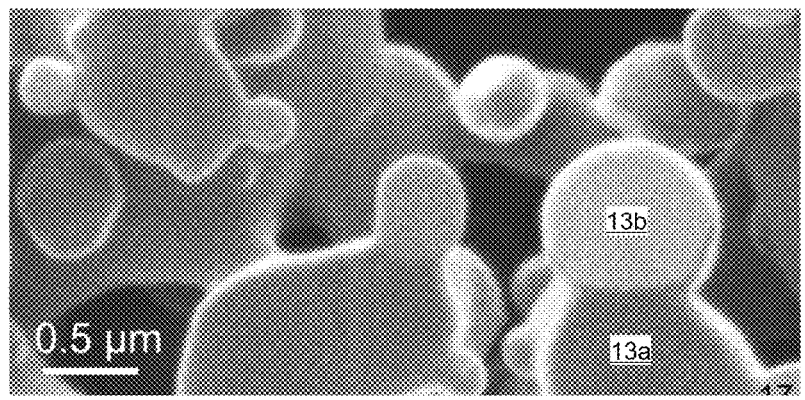
FIG. 10B shows a FIB-SIM image of the catalyst layer of Example 1 in a condition after the alternating operation.
Figure 10C:
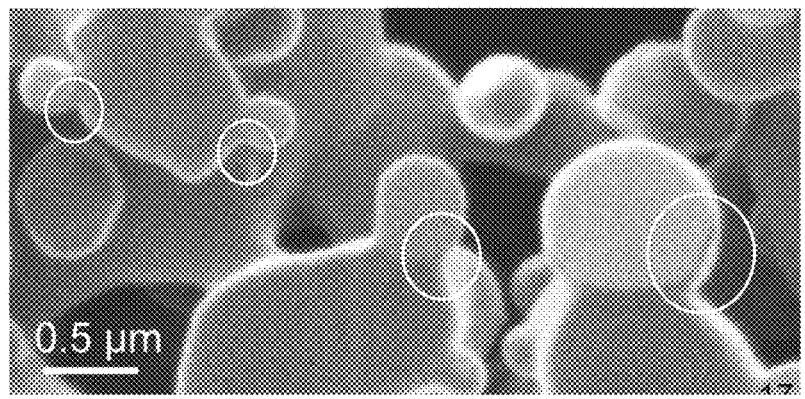
FIG. 10C shows a FIB-SIM image of the catalyst layer, in which the climbing portion in FIG. 10B is marked with white circle.

In order to investigate the reason of the stabilization of hydrogen electrode 10, as shown in FIG. 10, FIB-SIM images of the catalyst layer before operation and after the alternating operation of Example 1 were compared. As shown in FIG. 10A to FIG. 10B, by the alternating operation, the particle diameter of Ni-containing particles 13b became larger, and the oxide material for porous support 13a climbed up the side surface of the Ni-containing particles 13b thereby forming the climbing portion (shown with white circle in FIG. 10C).

4. Measurement of Buried Height Fraction

Figure 11:
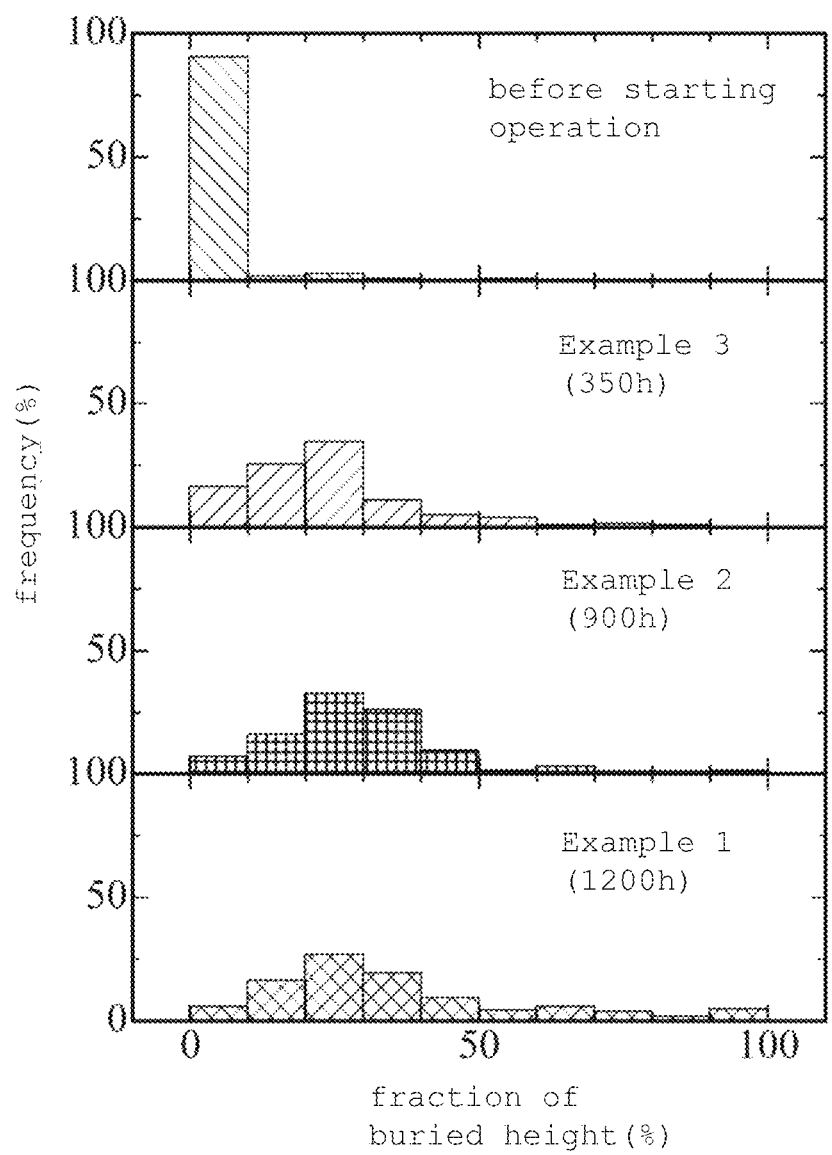
FIG. 11 shows histograms of the fraction of buried height measured for the catalyst layer before starting the operation and after the alternating operation of Examples 1 to 3.

The buried height fraction was measured with 200 or more Ni-containing particles 13b contained in the catalyst layer before operation and after the alternating operation of Examples 1 to 3. The results are shown in FIG. 11 and Table 3.

TABLE 3

| | before operation | Example | | |
|---|---|---|---|---|
| | | 1 | 2 | 3 |
| average buried height fraction (%) | 3.9 | 37.0 | 30.6 | 23.7 |
| number fraction of particles having buried height fraction of 0.2 or higher (%) | 7.5 | 77.5 | 77.0 | 58.0 |

As seen in the catalyst layer after alternating operation of Examples 1 to 3 in Table 3, the average buried height fraction was 0.1 or higher, and the number fraction of particles having buried height fraction of 0.2 or higher was 50% or higher. This result strongly suggests that a structural change in the hydrogen electrode 10 by the alternating operation contributes to the stabilization of the hydrogen electrode 10.

Figure 12:
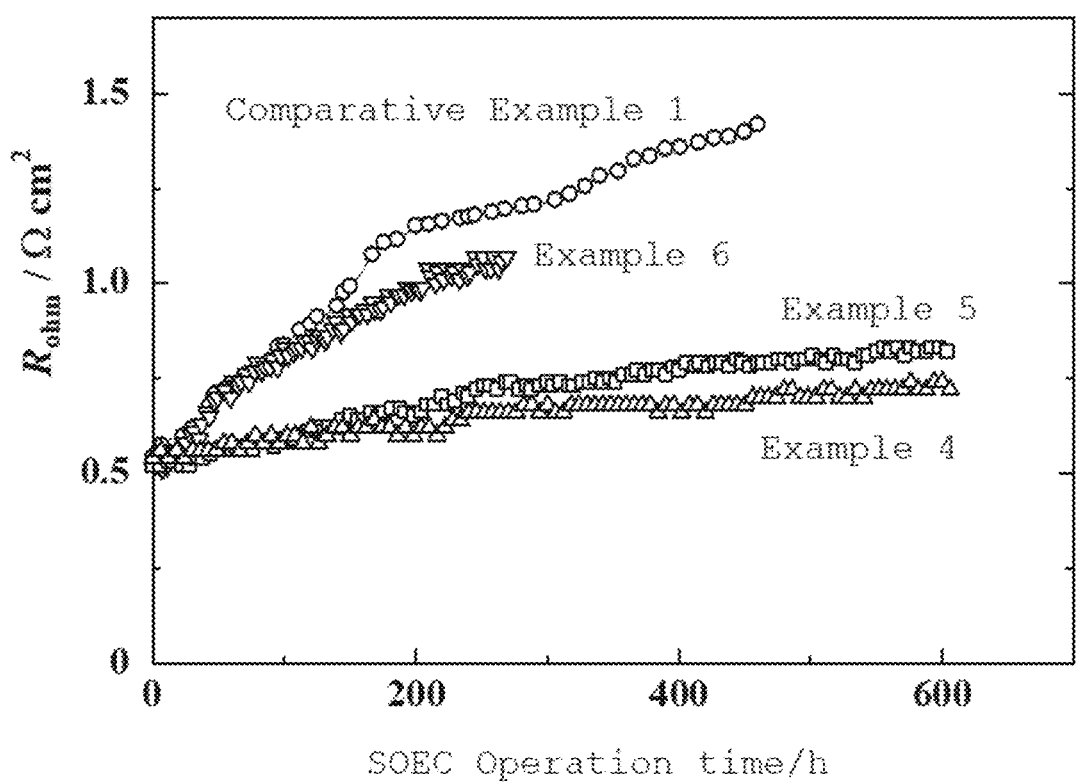
FIG. 12 is a graph showing the change in $R_{ohm}$ over time for Comparative Example 1 and Examples 4 to 6.

In Examples 4 to 6 in Table 4, and as shown in the results in FIG. 12, P-value (=T1/(T1+T2)) of Example 2 is 0.68, and P-value of Example 3 is 0.83. In FIG. 12, the degradation of Example 2 (with smaller P-value) is less than that of Example 3 (with larger P-value), supporting the fact that smaller P-value leads to more pronounced suppression of hydrogen electrode degradation.

TABLE 4

|  | Example | | |
|---|---|---|---|
|  | 4 | 5 | 6 |
| 1 cycle (h) | 24 | 24 | 8 |
| water vapor electrolysis operation time T1 (h) | 11 | 15 | 5 |
| fuel cell operation T2 (h) | 11 | 7 | 1 |
| T1/(T1 + T2) | 0.50 | 0.68 | 0.83 |
| total operation time (h) | 1200 | 900 | 350 |

1: solid oxide electrolysis cell, 10: hydrogen electrode, 11: hydrogen electrode separator, 12: current collecting layer, 12a: substrate particles, 12b: Ni-containing particles, 13: catalyst layer, 13a: porous material, 13b: Ni-containing particles, 13c: effective reaction zone, 13d: climbing portion, 20: electrolyte layer, 30: oxygen electrode, 31: oxygen electrode separator

The invention claimed is:

1. A method for operating a solid oxide electrolysis cell comprising a hydrogen electrode, an oxygen electrode, and an electrolyte layer sandwiched between the hydrogen electrode and the oxygen electrode;

the hydrogen electrode comprises a catalyst layer structured with Ni-containing particles dispersed and supported on a porous mixed ionic and electronic conducting oxide;

the method comprises an alternating operation step in which a water vapor electrolysis operation and a fuel cell operation are repeated alternately;

the hydrogen electrode has a double-layered structure comprising the catalyst layer and a current collecting layer contacting with the catalyst layer; and the current collecting layer is structured with a cermet of Ni-containing particles and yttria-stabilized zirconia wherein:

when a period beginning from start of operation of the electrolysis cell is referred to as an aging time, a period beginning from end of the aging time is referred to as an operating time, time for the water vapor electrolysis operation and time for the fuel cell operation within one cycle are represented as T1 and T2 respectively, and [T1/(T1+T2)] is represented as electrolysis operation time fraction, an electrolysis operation time fraction during the aging time is smaller than an electrolysis operation time fraction during the operating time, the electrolysis operation time fraction during the aging time is greater than or equal to 0.5, and T1 is 1 to 50 hours.

2. The method of claim 1, wherein:

the mixed ionic and electronic conducting oxide is a cerium-based composite oxide.

3. The method of claim 2, wherein:

the cerium-based composite oxide is gadolinia-doped ceria.

4. The method of claim 2, wherein:

the cerium-based composite oxide is samaria-doped ceria.

5. The method of claim 1, wherein:

the electrolyte layer is composed of yttria-stabilized zirconia.

6. The method of claim 1, wherein:

the catalyst layer comprises a stringed beads body which is formed by fusing and connecting a plurality of the Ni-containing particles like stringed beads.

7. A solid oxide electrolysis cell system, comprising a control system configured to implement the method for operating of claim 1.

* * * * *